No. 775,695. PATENTED NOV. 22, 1904.
E. L. YOUNG.
PUZZLE.
APPLICATION FILED MAY 27, 1904.
NO MODEL.

Witnesses:
P. W. Pezzetti
E. Batchelder

Inventor:
E. L. Young
By Wright Brown Quinby
Attys.

No. 775,695. Patented November 22, 1904.

UNITED STATES PATENT OFFICE.

ELEAZER L. YOUNG, OF BOSTON, MASSACHUSETTS.

PUZZLE.

SPECIFICATION forming part of Letters Patent No. 775,695, dated November 22, 1904.

Application filed May 27, 1904. Serial No. 210,077. (No model.)

*To all whom it may concern:*

Be it known that I, ELEAZER L. YOUNG, of Boston, in the county of Suffolk and State of Massachusetts, have invented certain new and useful Improvements in Puzzles, of which the following is a specification.

This invention has for its object to provide a novel and attractive puzzle of relatively inexpensive construction; and it consists in the device which I will now proceed to describe.

Figure 1:
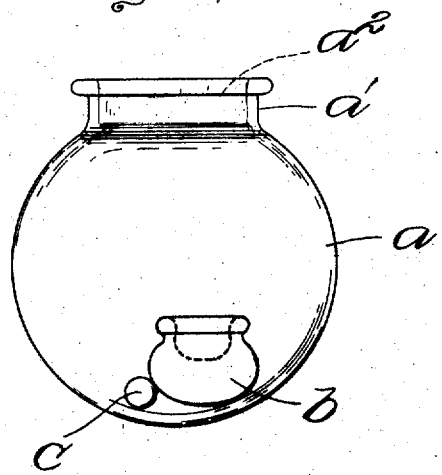
Figure 2:
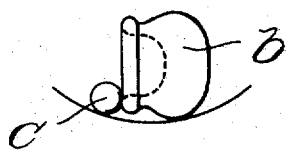
Figure 3:

Of the accompanying drawings, forming a part of this specification, Figure 1 represents a side elevation of my improved puzzle. Fig. 2 represents a sectional view of one of the parts thereof. Fig. 3 represents a view showing the receptacle tipped on its side.

The same letters of reference indicate the same parts in all of the figures.

In the drawings, $a$ represents a transparent holder made, preferably, of glass and of substantially spherical form, the holder having a neck $a'$, which is tightly closed by a movable stopper $a^2$. Within the holder $a$ are loosely placed a receptacle $b$ and a ball or pellet $c$, which is adapted to enter the cavity of the receptacle $b$. The form of the receptacle $b$ is preferably as represented in Figs. 1 and 2, and its bottom portion is weighted, as shown in Fig. 2, so that in case the receptacle stands on one side, as shown in Fig. 3, and an effort is made to roll the pellet into it the receptacle will tip quickly to the position shown in Fig. 1, thus frustrating said attempt.

The receptacle $b$ may be made of earthenware or any suitable material, and the pellet $c$ may be any small substantially spherical body adapted to readily enter and leave the cavity of the receptacle $b$.

The feat to be accomplished in using this puzzle is to lodge the pellet $c$ in the receptacle $b$. This is done by suitably manipulating the holder until the desired result is accomplished.

As will be observed, the bottom of the holder $a$ is concave internally, and therefore there are no corners or angles into which the receptacle $b$ can be shifted and held in a tilted position while the pellet is being manipulated. In other words, the concave bottom of the holder $a$ coacts with the weighted bottom of the receptacle $b$ in preventing the latter from being temporarily lodged in a tilted position, thereby increasing the difficulty of manipulating the puzzle so as to lodge the pellet $c$ in the receptacle $b$.

I claim—

An improved puzzle comprising a transparent holder having a concave bottom, a receptacle placed loosely therein and having its bottom portion weighted and externally rounded, and a pellet also placed loosely in the holder and adapted to enter and leave the receptacle.

In testimony whereof I have affixed my signature in presence of two witnesses.

ELEAZER L. YOUNG.

Witnesses:
C. F. BROWN,
E. BATCHELDER.